(12) United States Patent  
Cochran

(10) Patent No.: US 6,524,451 B1
(45) Date of Patent: Feb. 25, 2003

(54) DUAL CONICAL ECM GROOVING DEVICE

(75) Inventor: Dustin A. Cochran, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/699,203

(22) Filed: Oct. 26, 2000

Related U.S. Application Data

(60) Provisional application No. 60/161,688, filed on Oct. 26, 1999.

(51) Int. Cl.[7] .......................... B23H 3/00; B23H 7/04; B23H 7/14
(52) U.S. Cl. ................ 204/228.3; 204/224 M
(58) Field of Search .................. 204/224 M, 228.3; 205/641, 642, 645, 652, 654, 672

(56) References Cited

U.S. PATENT DOCUMENTS

| | | | |
|---|---|---|---|
| 4,690,737 A | * 9/1987 | Vishnitsky | 204/224 M |
| 5,002,643 A | * 3/1991 | Andrews | 204/224 M |
| 5,758,421 A | 6/1998 | Asada | |
| 5,878,495 A | 3/1999 | Martens et al. | |
| 5,914,832 A | 6/1999 | Teshima | |

* cited by examiner

*Primary Examiner*—Nam Nguyen
*Assistant Examiner*—Wesley A. Nicolas
(74) *Attorney, Agent, or Firm*—Moser, Patterson & Sheridan, LLP

(57) ABSTRACT

A dual cone or single cone work piece is placed inside a pair of locating surfaces so that it is accurately held within a framework defined by these locating surfaces. A electrode is then inserted inside the cone, and is movable within the cone to accurately set the gap between the electrode which will find the groove pattern to be formed on the cone surface. An electrolyte is then pumped through the gap between the cone and the electrode.

16 Claims, 3 Drawing Sheets

DUAL CONICAL ECM GROOVING DEVICE

CROSS-REFERENCE TO RELATED APPLICATION

This application is based on U.S. Provisional Patent Application Serial No. 60/161,688 filed on Oct. 26, 1999, entitled DUAL CONICAL ECM GROOVING DEVICE, invented by inventor Dustin A. Cochran. The priority of this provisional application is hereby claimed and is incorporated herein by reference.

FIELD OF THE INVENTION

This invention pertains generally to the field of fluid dynamic bearings, and more particularly to etching grooves in a hub used in a spindle motor of a disc drive to form such bearings.

BACKGROUND OF THE INVENTION

Disc drives, including magnetic disc drives, optical disc drives and magneto-optical disc drives, are widely used for storing information. A typical disc drive has one or more discs or platters which are affixed to a spindle and rotated at high speed past a read/write head suspended above the discs on an actuator arm. The spindle is turned by a spindle drive motor. The motor generally includes a shaft having a thrust plate on one end, and a rotating hub having a sleeve and a recess into which the shaft with the thrust plate is inserted. Magnets on the hub interact with a stator to cause rotation of the hub relative to the shaft.

In the past, conventional spindle motors frequently used conventional ball bearings between the hub and the shaft and the thrust plate. However, over the years the demand for increased storage capacity and smaller disc drives has led to the read/write head being placed increasingly close to the disc. Currently, read/write heads are often suspended no more than a few millionths of an inch above the disc. This proximity requires that the disc rotate substantially in a single plane. Even a slight wobble or run-out in disc rotation can cause the disc to strike the read/write head, damaging the disc drive and resulting in loss of data. Because this rotational accuracy cannot be achieved using ball bearings, the latest generation of disc drives utilize a spindle motor having fluid dynamic bearings on the shaft and the thrustplate to support a hub and the disc for rotation.

In a fluid dynamic bearing, a lubricating fluid such as gas or a liquid or air provides a bearing surface between a fixed member and a rotating member of the disc drive. Dynamic pressure-generating grooves formed on a surface of the fixed member or the rotating member generate a localized area of high pressure or a dynamic cushion that enables the spindle to rotate with a high degree of accuracy. Typical lubricants include oil and ferromagnetic fluids. Fluid dynamic bearings spread the bearing interface over a large continuous surface area in comparison with a ball bearing assembly, which comprises a series of point interfaces. This is desirable because the increased bearing surface reduces wobble or run-out between the rotating and fixed members. Further, improved shock resistance and ruggedness is achieved with a fluid dynamic bearing. Also, the use of fluid in the interface area imparts damping effects to the bearing which helps to reduce non-repeat runout.

One generally known method for producing the dynamic pressure-generating grooves is described in U.S. Pat. No. 5,758,421, to Asada, (ASADA), hereby incorporated by reference. ASADA teaches a method of forming grooves by pressing and rolling a ball over the surface of a workpiece to form a groove therein. The diameter of the ball is typically about 1 mm, and it is made of a material such as carbide which is harder than that of the workpiece. This approach and the resulting fluid dynamic bearing, while a tremendous improvement over spindle motors using a ball bearing, is not completely satisfactory. One problem with the above method is the displacement of material in the workpiece, resulting in ridges or spikes along the edges of the grooves. Removing these ridges, for example by polishing or deburring, is often a time consuming and therefore a costly process. Moreover, to avoid lowering yields, great care must be taken not to damage the surface of the workpiece.

A further problem with the above method is due to a recent trend in disc drives toward higher rotational speeds to reduce access time, that is the time it takes to read or write data to a particular point on the disc. Disc drives now commonly rotate at speeds in excess of 7,000 revolutions per minute. These higher speeds require the shaft and the hub to be made of harder material. Whereas, in the past one or more of the shaft, the sleeve or the hub, could be made of a softer material, for example brass or aluminum, now all of these components must frequently be made out of a harder metal such as, for example, steel, stainless steel or an alloy thereof. These metals are as hard or harder than the material of the ball. Thus, the above method simply will not work to manufacture fluid dynamic bearings for the latest generation of disc drives.

Another method for producing the grooves of a fluid dynamic bearing is described in U.S. Pat. No. 5,878,495, to Martens et al. (MARTENS), hereby incorporated by reference. MARTENS teach a method of forming dynamic pressure-generating grooves using an apparatus, such as a lathe, having a metal-removing tool and a fixture that moves the workpiece incrementally in the direction in which a pattern of grooves is to be formed. The metal-removing tool forms the grooves by carrying out a short chiseling movement each time the workpiece is moved. This approach, while an improvement over the earlier one in that it does not produce ridges that must be removed, is also not completely satisfactory. For one thing, this approach like that taught by ASADA is typically not suitable for use with harder metals, which in addition to being more difficult to machine are often brittle and can be damaged by the chiseling action. Moreover, because each groove or portion of a groove must be individually formed and the workpiece then moved, the process tends to be very time consuming and therefore costly. Furthermore, the equipment necessary for this approach is itself expensive and the metal-removing tool is subject to wear and requires frequent replacement.

A final method for producing the grooves involves a conventional etching process as described in U.S. Pat. No. 5,914,832, to Teshima (TESHIMA), hereby incorporated by reference. TESHIMA teaches a process in which the workpiece is covered with a patterned etch resistant coating prior to etching so that only the exposed portions of the workpiece are etched. While this approach avoids many of the problems of the previously described methods, namely the formation of ridges around the grooves and the inability to form grooves in hard metal, it creates other problems and therefore is also not wholly satisfactory. One problem is the time consumed in applying and patterning the etch resistant coat. This is particularly a problem where, as in TESHIMA, the resist coat must be baked to prior to patterning or etching. Another problem is that the coating must be removed after etching. This is frequently a difficult task, and one that if not done correctly can leave resist material on the workpiece surface resulting in the failure of the bearing and destruction of the disc drive. Yet another problem with this approach is that each of the steps of the process requires the extensive use of environmentally hazardous and often toxic chemicals including photo resists, developers, solvents and strong acids.

Accordingly, there is a need for an apparatus and method for forming grooves in a workpiece made of a hard metal to manufacture fluid dynamic bearings suitable for use in a disc drive. It is desirable that the apparatus and method that allows the grooves to formed quickly and cheaply. It is also desirable that the apparatus and method not require expensive equipment or the use of a metal-removing tool that must be frequently replaced. It is further desirable that the apparatus and method not use an etch resistant material during manufacture that could contaminate the workpiece leading to the failure of the bearing and destruction of the disc drive.

As the result of the above problems, electrochemical machining of grooves in a fluid dynamic bearing has been developed as described in the above-incorporated patent application. A broad description of ECM is as follows. ECM is a process of removing material metal without the use of mechanical or thermal energy. Basically, electrical energy is combined with a chemical to form a reaction of reverse electroplating. To carry out the method, direct current is passed between the work piece which serves as an anode and the electrode, which typically carries the pattern to be formed and serves as the cathode, the current being passed through a conductive electrolyte which is between the two surfaces. At the anode surface, electrons are removed by current flow, and the metallic bonds of the molecular structure at the surface are broken. These atoms go into solution, with the electrolyte as metal ions and form metallic hydroxides. These metallic hydroxide (MOH) molecules are carried away to be filtered out. However, this process raises the need to accurate and simultaneously place grooves on a surface across a gap which must be very accurately measured, as the setting of the gap will determine the rate and volume at which the metal ions are carried away. Even in simple structures, this problem can be difficult to solve. When the structure is the interior surface of a conical bearing, the setting of the gap width can be extremely difficult. Manufacturability issues associated with conical parts often make it difficult to control the diameter of the cones. Therefore, it is almost impossible to make a tool with fixed electrodes that will guarantee a continued consistent work piece to electrode gap. As noted above, the distance is paramount to the accuracy of grooved depth.

The present invention provides a solution to these and other problems, and offers other advantages over the prior art.

SUMMARY OF THE INVENTION

The present invention relates to a method and apparatus for electrochemically etching grooves in a surface of a conical bearing to form a fluid dynamic bearing.

In accordance with one embodiment, the dual cone or single cone work piece is placed inside a pair of locating surfaces so that it is accurately held within a framework defined by these locating surfaces. A electrode is then inserted inside the cone, and is movable within the cone to accurately set the gap between the electrode which will find the groove pattern to be formed on the cone surface. An electrolyte is then pumped through the gap between the cone and the electrode.

In order to reliably establish the grooves on the work piece, it is essential to be able to set the gap between the moving electrode and the interior surface of the conical work piece. According to a preferred embodiment of the present invention, the electrode work piece gap itself is a critical orifice which accurately restrains the flow of electrolyte between the electrode and the work piece, the electrolyte being the essential element in removing material while electric energy is applied across the gap. In order to simplify the present process and make it as easily repetitive as possible, the method used to set the critical orifice is inverted relative to known flow measurement techniques. The electrolyte is provided at a standard flow rate or static pressure to the gap. Then the spacing between the electrode and the work piece surface is varied by moving the electrode to yield a predefined, measurable mass flow. For example, if electrolyte is provided at a given static pressure X to the gap, then the gap is varied until a predetermined flow Y is measured. Once the mass flow Y is measured, then the gap has been accurately set without having any need to measure the gap itself. At this time, the electric current can be applied, for a known time duration and at a known current level, and the depth and quality of the grooves will be automatically established.

Other features and advantages of this invention will be apparent to a person of skill in this field who studies the following detailed description of embodiments of the invention given in conjunction with the associated drawings.

DETAILED DESCRIPTION OF THE INVENTION

Figure 1:
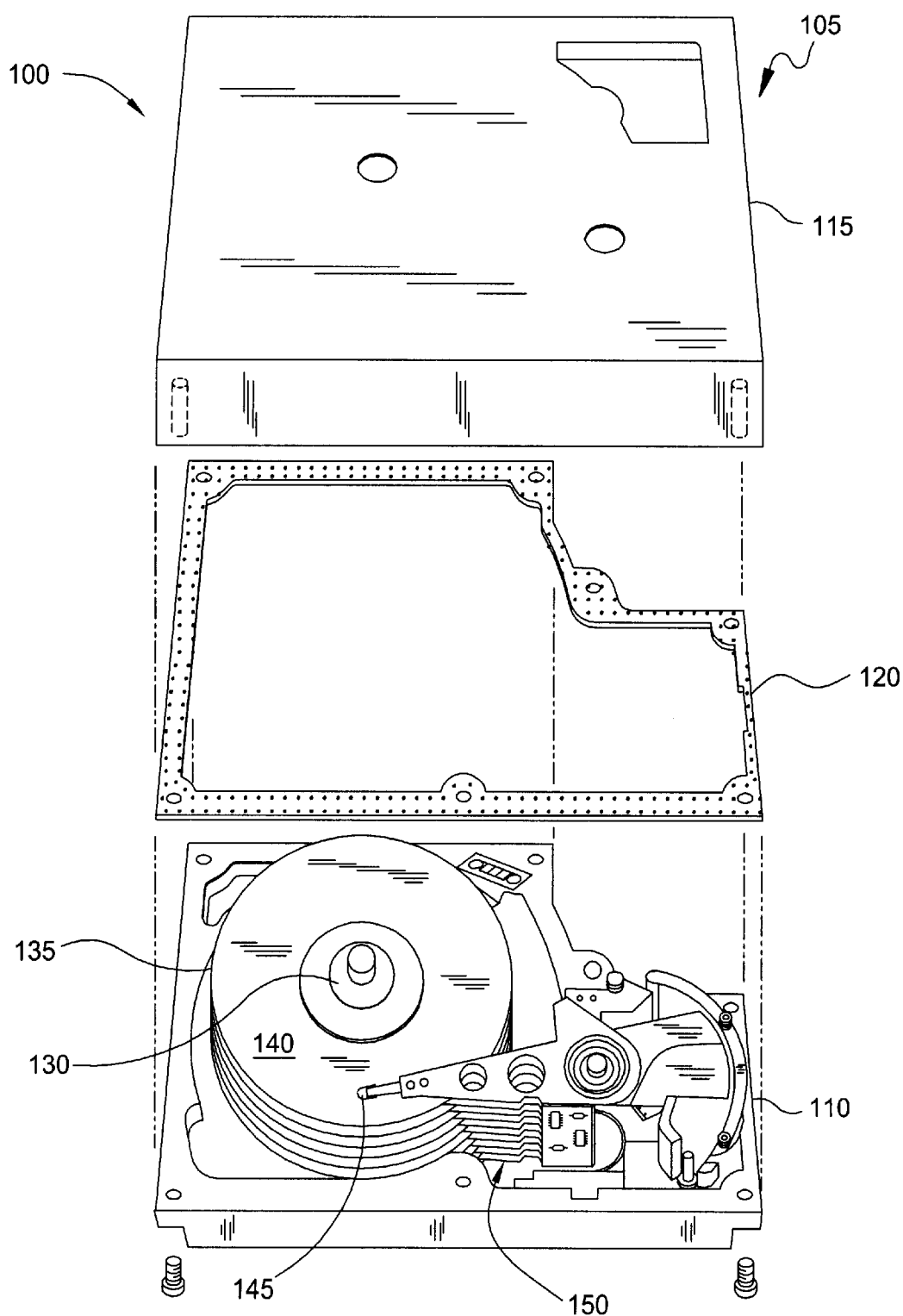
FIG. 1 is an exploded view of a disc drive in which the present invention is especially useful.

FIG. 1 is an exploded perspective view a magnetic disc drive for which a spindle motor having a fluid dynamic bearing manufactured by the method and apparatus of the present invention is particularly useful. Referring to FIG. 1, a disc drive 100 typically includes a housing 105 having a base 110 sealed to a cover 115 by a seal 120. The disc drive 100 has a spindle 130 to which are attached a number of discs 135 having surfaces 140 covered with a magnetic media (not shown) for magnetically storing information. A spindle motor (not shown in this figure) rotates the discs 135 past read/write heads 145 which are suspended above surfaces 140 of the discs by a suspension arm assembly 150. In operation, spindle motor rotates the discs 135 at high speed past the read/write heads 145 while the suspension arm assembly 150 moves and positions the read/write heads over one of a several radially spaced tracks (not shown). This allows the read/write heads 145 to read and write magnetically encoded information to the magnetic media on the surfaces 140 of the discs 135 at selected locations.

Figure 2:
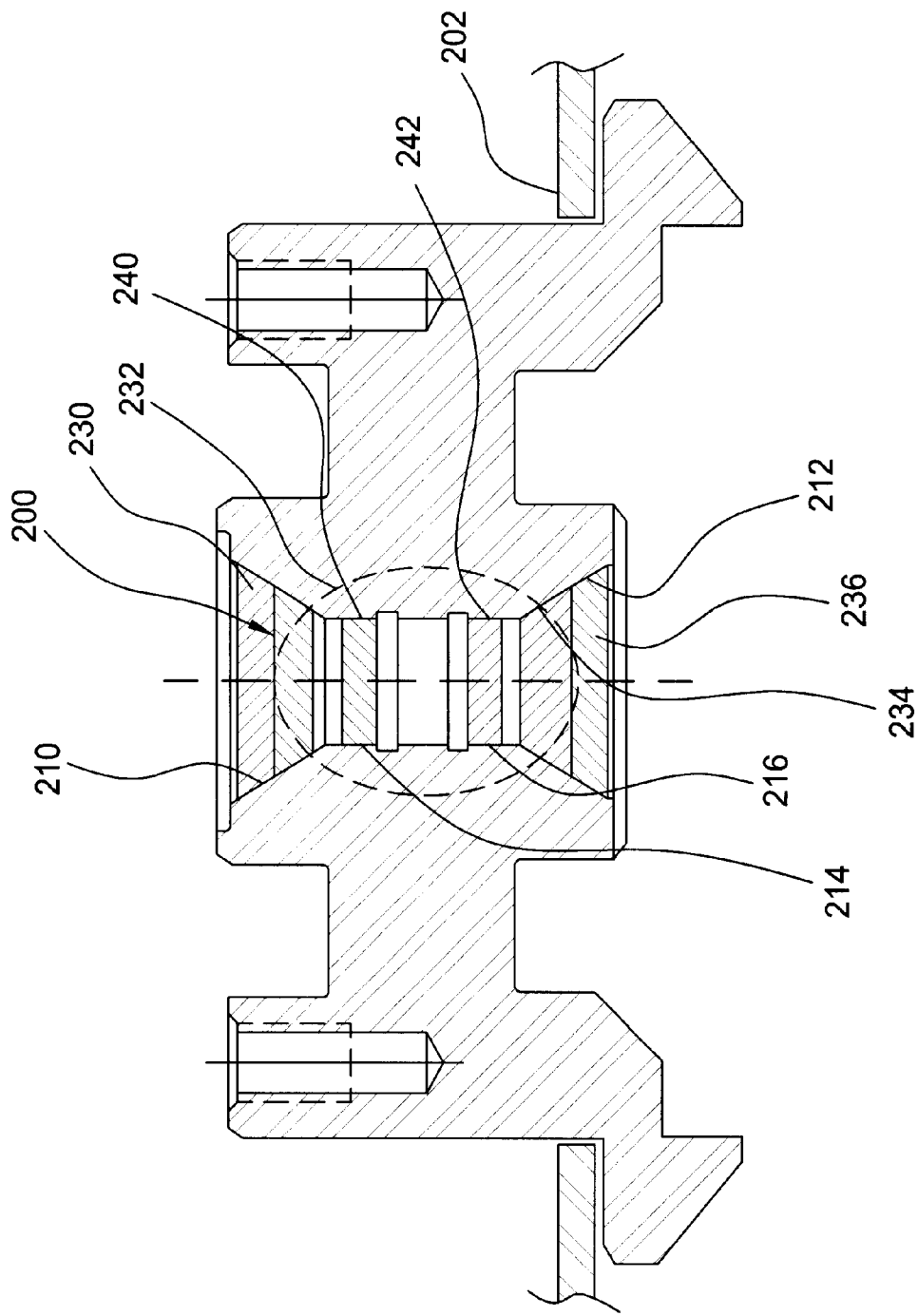
FIG. 2 is a vertical sectional view of a hub utilized in a spindle motor in the disc drive of FIG. 1 showing a dual conical bearing which is of a type which may usefully be formed by the present invention.

FIG. 2 is a vertical sectional view of a hub supported by dual conical and journal bearing 200 for rotation about a shaft not shown. The hub included in 201 is integrated with the sleeve whose internal surfaces define the grooves which form the hydrodynamic bearing which supports the hub for rotation. As is well-known in this technology, a shaft (not shown) is inserted within the hub and has dual conical surfaces which face the conical regions 210, 212 at the upper and lower ends of the bearing region. The shaft would further include a smooth center section which would cooperate with the journal bearings defined by the grooved regions 214, 216. As is well-known in this field of fluid dynamic bearings, fluid will fill the gap between the stationary shaft and the inner grooved surfaces of the sleeve. As the sleeve rotates, under the impetus of interaction between magnets mounted on an inner surface of the hub which cooperate with windings supported from the base of the hub, pressure is built up in each of the grooved regions. In this way, the shaft easily supports the hub for constant high speed rotation.

The pressure generating grooves on the inner surface of the sleeve can easily be seen FIG. 2. They include, in the preferred example, two sets of grooves 230, 232 for the upper cone and a corresponding set 234, 236 for the lower cone. This particular design also utilizes two journal bearings 240, 242 to further stabilize the shaft. Obviously, the present invention, which is directed especially to a method and apparatus for making these grooves rather than the design of the grooves themselves, is not limited to making this particular combination of grooved designs. For example, the apparatus and method described could be used to make the grooves inside a single cone or a single cone cooperating with a single journal bearing or dual cones cooperating with one or more journal bearings. Further, each of the conical bearings could have one or more sets of grooves. The principles of the present invention are to be especially applicable in forming any design of conical bearing. The solution provided by this invention is important in defining conical bearings because manufacturability issues associated with conical parts often make it difficult to control the diameter of the cones. Given this, it is extremely hard to make a tool with fixed electrodes that will guarantee a consistent work piece to electrode gap. As described above, this gap distance is paramount to the accuracy of groove depth.

Considering fluid dynamic bearings, the importance of the accuracy of grooves is that a fluid dynamic bearing generally comprises two relatively rotating members having juxtaposed surfaces between which a layer or film or fluid is maintained to form a dynamic cushion an antifriction medium. To form the dynamic cushion, at least one of the surfaces, in this case the interior surface of the hub and sleeve, is provided with grooves which induce fluid flow in the interfacial region and generate a localized region of dynamic high pressure. The grooves are separated by raised lands or ribs and have a depth generally of about 0.009 to 0.015 mm. It is readily apparent that it can be extremely difficult to form grooves having these small dimensions that are relatively closely packed on a surface. To this end, the work piece, which in this case is the hub of FIG. 2, is placed in the grooving device shown in FIG. 3.

Figure 3:
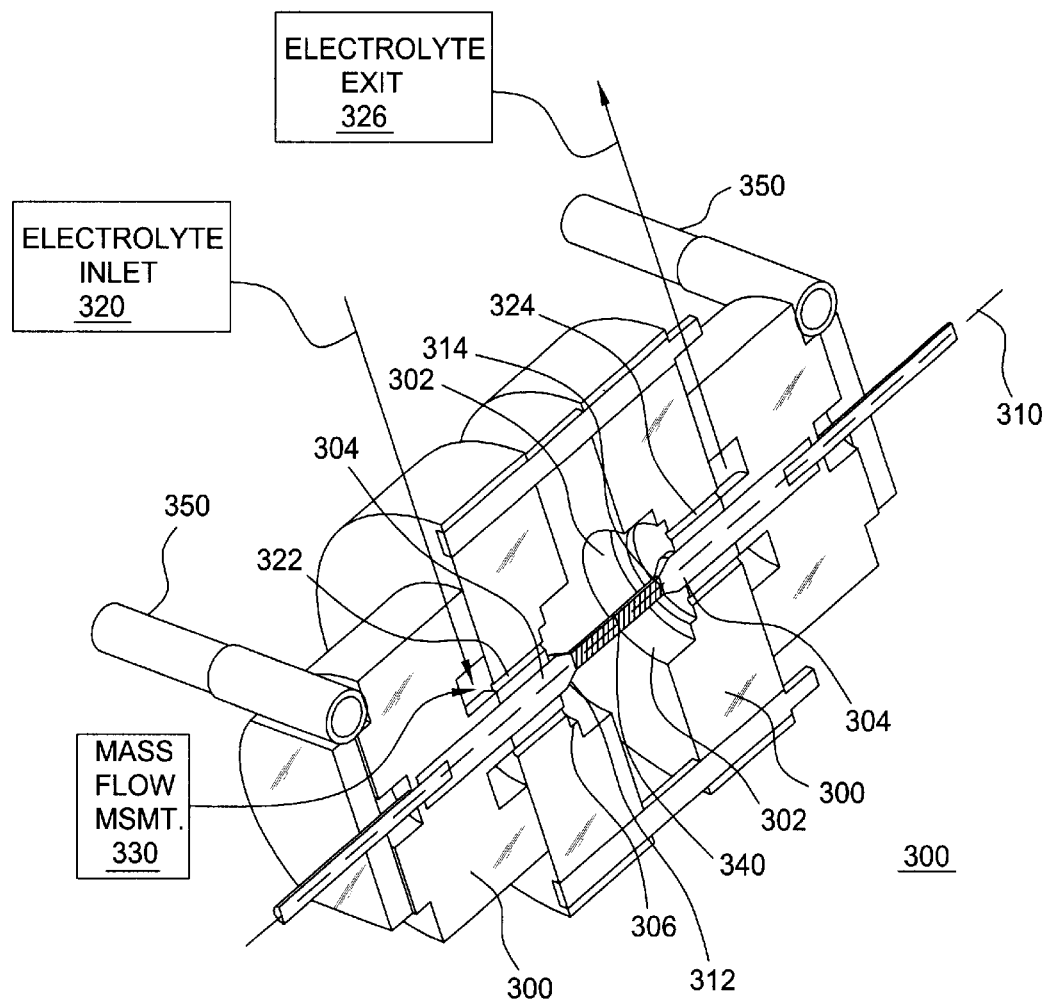
FIG. 3 is a cutaway view of the ECM system of the present invention.

The apparatus for forming grooves using ECM is shown especially in FIG. 3. The work piece of FIG. 2 is placed within the frame 300; as can be seen the frame 300 is configured to define a cavity 302 which has a pair of electrodes 304 running through the center. When the work piece 200 is placed in the cavity 302, it is generally held firmly in place within the edges of the framing pieces 306. The electrodes 304 which are axially movable along axis 310, include both a conical region 312 which will cooperate with the internal cone 210 of the hub and a journal region 314 extending from a narrow end of the conical electrode which will cooperate with the internal hub 210 and sleeve 214.

When the work piece 200 is in place in the frame, the electrodes 304 are moved back and forth along the axis 310 until the gap between each electrode and the facing surface of the work piece is established. It can be seen, as generally represented in the figure, that each of the electrodes carries the pattern which is to be imposed on the inner surface of the conical and journal region of the work piece. It is also readily apparent that the problem remaining is to accurately set the gap, which must be measured in microns, between the movable electrodes and the work piece which is being held in place in the frame, and to do so quickly and repetitively on a high speed basis. According to the present invention, this measurement can be achieved before the electric current is turned on, by beginning to pump electrolyte through the electrolyte inlet 320. The electrolyte will move through this inlet and the inlet channel 322 and pass between the interior of the work piece or hub and the exterior of the electrolyte, to exit through the exit channel 324 and exit 326. It should, of course, be apparent that the direction of flow is arbitrary. To check the setting of the gap between the electrode and the interior of the work piece, a mass flow measurement device 330 of a type well-known in this field is used. This mass flow measurement device is precalibrated in units to a specific number which represents the setting of the gap. In other words, the electrode work piece gap is a critical orifice. According to the method practiced herein, electrolyte at a static fixed pressure (which preferably for ease of use is always the same) is applied to the inlet 320 and the inlet gap 322. As the gap between the electrode 304 and the work piece 200 is modified by moving the electrodes, the mass flow measurement will change. By always adjusting the mass flow measurement to a critical target number, the same gap is always defined between the electrode and the work piece surface. Obviously, this method is especially applicable to defining the gap between an electrode conical surface and a work flow conical surface.

Further, it can be seen that this method would typically work best, in the case of a dual conical work piece such as used herein, if the two electrodes are ganged together so that they move axially toward and away from each other. Finally, to prevent fluid loss and a possible small fluid misreading, a sleeve or the like should bridge the gap 340 between the two electrodes which are moving toward each other.

The ECM process can then be executed by then applying an electrical potential to the work piece and electrode, the work piece receiving the positive potential and the electrode serving as the cathode and receiving the negative potential. By timing the current flow, an imprint in the form of the groove pattern shown in FIG. 2 is placed on the work piece. As is well-known, the width and depth of the resulting grooves is controlled by the duration and level of current applied to the work piece 200 and the cathode 304. The current level being modified primarily by the gap which has now been carefully adjusted by other electrolyte perimeters.

The axially adjustment of the electrodes is achieved preferably by a worm and gear arrangement 350 shown at either end of the frame and of a type well-known in this technology. Such worm and gear arrangements are capable of precise axially movement of the electrodes and if desired can be easily gang coupled together.

Other uses, features and advantages of the present invention will become apparent to a person of skill in the art who studies the above invention disclosure. Therefore, the scope of the present invention is to be limited only by the following claims.

What is claimed:

1. Apparatus for electrochemically etching grooves in a surface of a conical bearing to be utilized in a fluid dynamic bearing comprising a frame for holding the conical bearing acting as a conical work piece in place about an axis and adapted to face a movable conical electrode the electrode being axially movable and having a surface carrying a groove pattern adapted to be formed on the inner surface of a cone on the conical bearing;

a source of electrolyte to be pumped in a gap between the surface of the electrode and the inner surface of the cone at a standard flow rate; and a mass flow measurement device for measuring the amount of electrolyte flowing through the gap, the electrode being movable axially until a predetermined mass flow is measured.

2. Apparatus as claimed in claim 1 wherein the electrode is mounted in the frame which supports the cone.

3. Apparatus as claimed in claim 1 wherein the conical electrode supports a plurality of groove patterns on an outer surface thereof, the plurality of groove patterns being used to form a plurality of groove patterns on the inner surface of the cone.

4. Apparatus as claimed in claim 3 wherein the conical work piece is joined to a shaft, extending from a narrow end of the work piece thereby forming a journal work pierce, and wherein the electrode includes a journal section extending from a narrow end of the conical electrode and cooperating with the shaft section of the work piece thereby forming a journal electrode, the journal electrode supporting a groove pattern to be formed on a interior surface of the journal work piece.

5. Apparatus as claimed in claim 1 wherein the work piece comprises a pair of cones whose narrow ends are joined by a shaft, and wherein the device comprises a pair of electrodes movable relative to the cones toward and away from each other along a common axis which extends through a center of the work piece.

6. Apparatus as claimed in claim 5 wherein the frame supports an element for moving the electrodes toward and away from each other, the electrode moving device being ganged together so that the electrodes move actually toward and away from each other in unison.

7. Apparatus as claimed in claim 1 further comprising a source of electrical potential to be applied to the work piece and the electrode, respectively.

8. Apparatus as claimed in claim 7 wherein the device further includes a control for controlling the duration and level of current applied to the work piece and cathode.

9. Apparatus for electrochemically etching grooves in a surface of a conical work piece comprising means for fixedly supporting the work piece in the apparatus; and means for locating an electrode having a groove pattern to be etched in the work piece a fixed distance across a gap from the conical surface of the work piece.

10. Apparatus as claimed in claim 9 including means for supplying electrolyte to the gap and for setting the gap.

11. Apparatus as claimed in claim 9 wherein the means for locating the electrode also supports the conical work piece.

12. Apparatus as claimed in claim 9 wherein the electrode supports a plurality of groove patterns on an outer surface thereof, the plurality of groove patterns being used to form a plurality of groove patterns on the inner surface of the conical work piece.

13. Apparatus as claimed in claim 9 wherein the conical work piece is joined to a shaft, extending from a narrow end of the work piece thereby forming a journal work pierce, and wherein the electrode includes a journal section extending from a narrow end of the conical electrode and cooperating with the shaft section of the work piece thereby forming a journal electrode, the journal electrode supporting a groove pattern to be formed on a interior surface of the journal work piece.

14. Apparatus as claimed in claim 9 wherein the work piece comprises a pair of cones whose narrow ends are joined by a shaft, and wherein the apparatus comprises a pair of electrodes movable relative to the cones toward and away from each other along a common axis which extends through a center of the work piece.

15. Apparatus as claimed in claim 10 wherein the means for fixedly supporting comprises an electrode moving device which includes an element for moving the electrodes toward and away from each other, the electrode moving device being ganged together so that the electrodes move actually toward and away from each other in unison.

16. Apparatus as claimed in claim 11 wherein the apparatus further includes a control for controlling the duration and level of current applied to the work piece and cathode.

* * * * *